United States Patent Office 3,332,771
Patented July 25, 1967

3,332,771
RECOVERY OF PLATINUM METALS
Henry M. Heidt, Powell, Tenn., assignor to the United
States of America as represented by the United States
Atomic Energy Commission
No Drawing. Filed July 30, 1964, Ser. No. 386,456
16 Claims. (Cl. 75—83)

The present invention relates generally to processes for recovering metals and more particularly to an improved method for recovering platinum metals.

The platinum metals have a widely diversified and varied utility. For example, platinum with its extreme resistance to chemical attack, durability, and excellent working properties is widely used in the manufacture of crucibles, dishes, boats, etc., for chemical work and in making electrodes and resistance wires for electric furnaces. Rhodium is chiefly used in the form of a 90% pt-10% Rh alloy for thermocouples, and recently it has been found possible to deposit a thin film of rhodium on silver which does not affect the appearance of the finished product and beneficially aids in retarding tarnishing of the silver surface. On the other hand, osmium has found extensive use as tips for fountain pen nibs, while ruthenium is used to some extent as an alloy constituent for jewelry. Probably the greatest utility of the platinum metals is in the field of catalysts. These metals have been used extensively as catalytic agents for various chemical reactions and where so used have generally been employed in a finely-divided state. It should be noted that the particle size of platinum metals employed as catalysts in chemical reactions ranges, generally, anywhere from massive metal down to about 5 microns.

With such widespread usage, and coupled with the relative scarcity of these metals (palladium, which is the most abundant, forms only about 1 part in $10^8$ of the earth's crust), it is readily seen that it is highly desirable to find methods for recovering such metals from scraps, combustibles, etc. While there are a number of methods for winning these metals from the ores, methods for recovering these metals from various materials, such as metal scraps, have not been too attractive. This is generally attributed to the fact that most of the platinum metals are insoluble in strong acids, not even, in some cases, being dissolved in aqua regia; hence, they are quite resistive to most conventional recovery and/or purification methods.

Generally, these metals can be oxidized by alkaline fusion, such as by potassium acid sulfate or potassium pyrosulfate fusion. There the platinum metal, such as rhodium, is converted to the water soluble sulfate

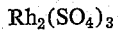

$$Rh_2(SO_4)_3$$

and the platinum metal is then recovered from the aqueous solution by contacting the solution with metallic ions, such as zinc, to precipitate rhodium metal. However, as will be discussed hereinafter in greater detail, this method has not been found to be completely suitable for such recovery operations.

It is, therefore, a primary object of the present invention to provide an improved method for recovering platinum metals.

Another object is to provide a method for recovering platinum metals from scraps, combustibles, etc., wherein the contained platinum metals are in a finely-divided state.

Still another object is to provide a safe and economical method for recovering platinum metals.

A further object is to provide an improved method for converting the platinum metals contained in scraps, combustibles, etc., to the water soluble form.

These and other objects and advantages, which will be apparent to those skilled in the art, are accomplished by providing an improved process for recovering platinum metals from materials containing the same therein comprising the steps of contacting the material with a strong oxidizing agent to dissolve a portion of the platinum metal and render the remaining platinum metal substantially stable when subsequently heated and thereafter performing an alkaline fusion on the remaining stabilized platinum metal, thereby oxidizing the platinum metal to the water soluble sulfate, and separately recovering the platinum metal.

When applicant attempted to follow the prior art teaching of oxidizing the platinum metal, which was recovered from aqueous solutions, as for example when rhodium-uranium alloy was dissolved in nitric acid, by performing an alkaline fusion thereon, the metal was found to undergo oxidation in an uncontrollable manner, resulting in an explosion. This is in direct conflict with the prior art teaching that the platinum metals, even in a finely-divided form, are quite stable even when heated. However, it was discovered that, by contacting the metal with a strong oxidizing agent, such as sulfuric acid, to partially oxidize the metal, prior to the fusion step, the acid in some manner stabilized the metal, so that it could subsequently be oxidized. This passivating action of the oxidizing agent is not completely understood and, while applicant does not wish to be bound by any rigid theory, it is postulated that, as for example in the case of sulfuric acid, the acid causes a surface film of platinum metal oxide to form on the metal, thereby precluding rapid oxidation of the metal and hence permitting oxidation to occur at a controlled rate. This is partially supported by the fact that, even though sulfuric acid is a strong oxidizing agent, the dissolution rate of the platinum metals in concentrated sulfuric acid is extremely slow, even where the platinum metal has a large surface area, i.e., in an extremely finely-divided state.

The particular oxidizing agent is not critical to the present invention; however, it should be a strong oxidizing agent and preferably in concentarted form. Of the strong oxidizing agents, various of the mineral acids, such as nitric and sulfuric, have been found to be quite suitable and may be employed either alone or in admixtures with other acids, such as $HNO_3$—HF (minor portion). Inasmuch as a convenient method for oxidizing the platinum metals, such as rhodium, is to conduct an alkaline fusion operation, resulting in the formation of the water soluble rhodium sulfate, it is preferred that the passivation step be carried out with sulfuric acid as the oxidizing agent. While other acids would work equally as well, it would, as for example if nitric acid were used, require that any of the rhodium which might be dissolved (about 3–5%) in the nitric acid solution be converted subsequently to the sulfate for further processing with the alkaline fusion-converted rhodium sulfate.

While this process is applicable to recovering and/or purifying any of the platinum metals from materials containing the same, the invention will be hereinafter illustrated as a method for recovering rhodium from rhodium-uranium alloy. In this respect, various of the platinum metals, such as rhodium, have been used in certain nuclear applications and in some cases have been fabricated with the nuclear fuel into metal articles. In such cases the rhodium may contain sufficient impurities to prevent its re-use directly and furthermore may contain too large an amount of uranium to permit direct disposal to industry. It may be noted, in passing, that the platinum metals when combining with other metals, such as uranium, generally do not alloy with such metals, but rather disperse in the metal in a finely-divided state, and upon subsequent dissolution, the platinum metal does not go into solution, but rather exists as a colloidal suspension, i.e., solid metal particles having a particle size of between 0.001 micron and 0.1 micron dispersed in the liquid.

While it is not certain exactly at what size range passivation of the metal particles is needed, it is known that passivation of metal particles in the submicron range, i.e., colloidal particles, is definitely required to prevent uncontrolled oxidation and it may be inferred from the prior art teaching of particle size of platinum metal catalysts that particles above about 5 microns appear to be stable. In any event, it may be stated that as the particle size of the platinum metal is decreased, especially in the submicron range, the need for passivation of the metal prior to performing alkaline fusion is increased.

In a first step of the present development the rhodium-uranium alloy is dissolved in strong aqueous acid, as for example nitric acid, to form a uranyl nitrate solution in which the rhodium metal is suspended in a finely-divided or colloidal form. For this dissolution, any of the mineral acids, such as nitric acid, have been found to be quite suitable and approximately 30% by weight nitric acid is preferred. In this respect it should be noted that, as previously known, the platinum metals, such as rhodium, are highly insoluble in most all strong acids and in such a dissolving step the amount of rhodium going into solution with the uranium is quite small. To effect complete dissolution of the uranium, digestion was carried out at a temperature of about 100° C. for a period of about 45 minutes (dissolution times of 45–60 minutes have been quite adequate for dissolving 1 kilogram of metal in three liters of aqueous acid solution). It will be apparent that the digestion period as well as the temperature may be varied for any given charge and acid concentration.

After the rhodium-uranium alloy is dissolved, the colloidal suspension of rhodium metal is next removed from the aqueous uranyl nitrate solution. While any conventional separation method, such as centrifugation and/or filtration, may be employed, applicant has found that the colloidal rhodium metal is somewhat difficult to remove by such means, but with the addition of a small quantity of a flocculating agent, such as Baker's reagent grade gelatin or starch, a highly efficient separation may be obtained. For this an addition of 0.02 wt. percent gelatin was quite suitable, affording better than 95% removal of the rhodium metal from the solution. While the filtration effectively separated the rhodium metal from the bulk of the uranium, it effected little or no separation of the rhodium from its cantaminants. At this point, the uranyl nitrate filtrate may be directed to conventional uranium recovery sections and recovery efforts concentrated upon removal of impurities from the rhodium metal.

Applicant has found that contacting the rhodium metal, along with any impurities, with a strong oxidizing agent prior to the pyrosulfate fusion operation is critical to the practice of the invention. In this respect the oxidizing agent, in some manner, passivates the rhodium metal making it possible to subsequently oxidize the rhodium in a controlled manner. For this, a digestion type operation wherein the sulfate slurry is digested for a period of time to convert a portion of the rhodium metal (about 20%) to the water soluble sulfate and to stabilize the remaining rhodium metal is preferred. A 98% by weight sulfuric acid solution and a digestion time of about 7 hours have been quite suitable. The sulfuric acid-treated rhodium and rhodium sulfate is then water washed, and the aqueous rhodium sulfate separated from the contaminated rhodium metal by conventional means, such as filtration or centrifugation, with the aqueous rhodium sulfate being directed to a reservoir for further processing.

The sulfuric acid-treated solid rhodium, still containing its impurities, is next subjected to an alkaline fusion operation. Whereas such a fusion operation was previously unsuccessful, applicant performed such a fusion operation on the sulfuric acid-contacted rhodium, resulting in essentially complete conversion of the rhodium to the soluble rhodium sulfate, as well as volatilizing a majority of the impurities present. To illustrate, applicant performed potassium pyrosulfate fusion on the contaminated rhodium metal by mixing the rhodium with an excess of potassium pyrosulfate salt ($K_2S_2O_7$) and heated the mixture to a temperature in exces of 750° C. While the fusion operation may be carried out at temperatures of about 750° C., applicant has found that, if the fusion were carried out at a temperature of about 900° C. for a period of about 8 hours, essentially 100% of the rhodium metal would be converted into rhodium sulfate in the solid state. The rhodium sulfate and the residue from the fusion operation are then water washed, the rhodium sulfate going into solution and leaving certain insoluble impurities, and filtered to separate out the fusion solid residue, adding the filtrate to the reservoir containing the first water wash. After the colloidal rhodium metal has been converted to the water soluble sulfate and separated from its impurities, the purified rhodium metal may be recovered by subjecting the aqueous rhodium sulfate to a conventional precipitation process wherein the rhodium is reduced to rhodium metal. For example, the aqueous rhodium sulfate may be contacted with zinc ions which reduces the rhodium to rhodium metal. It will be apparent that any metal which is higher on the electromotive series than rhodium may be employed and that zinc is only recited as a preferred metal. The rhodium metal thus obtained may contain zinc as a contaminant; however, the zinc contaminants may be removed by washing with sulfuric acid. The rhodium metal is then water washed and filtered to yield rhodium metal essentially free from impurities.

Further illustration of the quantitative aspects and procedures of the present invention is provided in the following examples. Examples I–IV demonstrate the effect of various oxidizing agents on passivating rhodium metals when subsequently heated, and Example V shows the effect of nitric acid solution on passivating iridium metal.

*Example I*

A one-kilogram charge of rhodium-uranium alloy was placed in a dissolver and contacted with 30% by weight nitric acid (2 liters of 60% $HNO_3$ and 1 liter $H_2O$). The dissolution was carried out at a temperature of 100° C. for 45 minutes and resulted in approximately 100% of the uranium going into solution, with the rhodium remaining as an insoluble colloid. After the dissolution was completed, the resulting solution was diluted to four liters, and 0.02 weight percent gelatin added to the solution to flocculate the colloidal rhodium. After the colloidal rhodium metal appeared to be sufficiently flocculated (15 minutes' stirring), the colloidal rhodium was separated from the uranium by vacuum filtration at a temperature of 60° C. and a vacuum of 25 inches of mercury. The residual solid (rhodium along with its impurities) was water washed three times, using 500 ml. (90° C.) with displacement rates of 2 gal./min./ft.² for the first two washes and 0.8 gal./min./ft.² for the third wash. An analysis of the filter cake indicated: 60% rhodium, 4% uranium (−0.4 gram of original uranium), 36% carbon.

The filter cake was divided into five gram samples and contacted with various oxidizing agents to determine the passivating effect of such agents on the rhodium metal. Four samples were prepared by placing a five-gram charge of the contaminated rhodium metal into separate beakers and to the respective beakers 100 ml. of nitric acid solution of various concentrations was added. The samples were digested for various periods of time at the boiling points of the respective solutions with additional acid being added periodically to maintain volume. After dissolution, the samples were filtered and the residual rhodium samples heated to temperatures between 250°–400° C. to determine the stability of the nitric acid-contacted rhodium metal. The results are shown in Table I below.

TABLE I.—EFFECT OF NITRIC ACID SOLUTIONS ON RHODIUM STABILITY

| Sample | Acid Concentration (percent) | Rh Dissolved (percent) | Retention Time (hrs.) | Observed Stability |
|---|---|---|---|---|
| 1 | 76 | 3-5 | 12 | Good. |
| 2 | 60 | 3-5 | 12 | Do. |
| 3 | 30 | [1] ND | 8 | Unstable. |
| 4 | 20 | [1] ND | 8 | Do. |

[1] No Dissolution.

The results in Table I show that, whereas the more concentrated nitric acid solutions passivated the rhodium metal, the less concentrated solutions were ineffectual in passivating the metal, resulting in an explosion of the sample when heated to about 250° C.

*Example II*

Three samples of the filter cake of Example I were prepared by placing a five-gram charge of the contaminated rhodium metal into separate beakers and adding to the respective beakers 100 ml. of sulfuric acid of various concentrations. Two additional samples were similarly prepared by adding to one beaker 100 ml. sulfuric acid and a minor portion (10 grams) of sulfur and to the other 100 ml. of concentrated sulfuric acid and a minor portion (25 grams) of hydrochloric acid. The stability of the sulfuric acid-contacted rhodium metal was determined as in Example I. The results are shown in Table II below.

TABLE II.—EFFECT OF SULFURIC ACID SOLUTIONS ON RHODIUM STABILITY

| Sample | Acid Concentration (percent) | Rh Dissolved (percent) | Retention Time (hrs.) | Observed Stability |
|---|---|---|---|---|
| 1 | 98 | 15 | 18 | Good. |
| 2 | 60 | 3-5 | 10 | Do. |
| 3 | 20 | [1] ND | 8 | Unstable. |
| 4 | 98 | 18-20 | 6 | Good. |
| 5 | [2] | 10 | 8 | Do. |

[1] No Dissolution.
[2] Concentrated.

From the results in Table II it may be seen that concentrated sulfuric acid as well as the admixture of $$H_2SO_4—HCl$$

afforded good passivation of the rhodium metal, even up to temperatures of 400° C., but the less concentrated acid did not passivate the rhodium metal, resulting in an explosion when the metal was heated to a temperature of about 250° C.

*Example III*

A single sample of the filter cake of Example I was prepared by placing a five-gram charge of the contaminated rhodium metal into a beaker and adding 100 ml. of 36% hydrochloric acid. The stability of the treated rhodium metal was determined as in Example I. The results are shown in Table II below.

TABLE III.—EFFECT OF HYDROCHLORIC ACID SOLUTIONS ON RHODIUM STABILITY

| Sample | Acid Concentration (percent) | Rh Dissolved (percent) | Retention Time (hrs.) | Observed Stability |
|---|---|---|---|---|
| 1  | 36 | ND [1] | 6 | Unstable. |

[1] No Dissolution.

From the results shown in Table III it may be seen that the hydrochloric acid solution alone was ineffectual in passivating the rhodium metal, resulting in the sample exploding upon being heated to a temperature of about 250° C.

*Example IV*

Three samples of the filter cake of Example I were prepared by placing a five-gram charge of the contaminated rhodium metal into separate beakers and adding to the respective beakers 100 ml. of HF, HF—HNO$_3$, HF (anhydrous) solutions, respectively. The stability of the treated rhodium metal was determined as in Example I. The results are shown in Table IV below.

TABLE IV.—EFFECT OF HYDROFLUORIC ACID SOLUTIONS ON RHODIUM STABILITY

| Sample | Acid Concentration (percent) | Rh Dissolved (percent) | Retention Time (hrs.) | Observed Stability |
|---|---|---|---|---|
| 1 | 70 | ND [1] | 20 | Unstable. |
| 2 | [2] | ND [1] | 36 | Do. |
| 3 | 100 | | | Do. |

[1] No Dissolution.
[2] Concentrated.

From the results shown in Table IV, it may be seen that the hydrofluoric acid alone was ineffectual in passivating the rhodium metal and in the case of the HF—HNO$_3$ the pyrophoric tendency of the rhodium metal was greatly diminished indicating that as long as there is sufficient nitric acid present admixtures of these acids may be utilized as passivating agents. It should be noted that the rhodium metal that was contacted with anhydrous HF exploded during the digestion step.

Example V demonstrates the effect of concentrated nitric acid on passivating irridium metal when subsequently heated.

*Example V*

A single sample was prepared by placing a five-gram charge of iridium metal into a beaker and adding 100 ml. of concentrated nitric acid. The stability of the nitric acid-contacted iridium metal was determined as in Example I. The results are shown in Table V below.

TABLE V.—EFFECT OF NITRIC ACID SOLUTIONS ON IRIDIUM STABILITY

| Sample | Acid Concentration (percent) | Ir Dissolved (percent) | Retention Time (hrs.) | Observed Stability |
|---|---|---|---|---|
| 1 | 76 | 3-5 | 12 | Good. |

The results in Table V show that concentrated nitric acid solutions afforded good passivation of the iridium metal, even up to temperatures of 400° C.

Example VI describes a process for recovering rhodium metal from a rhodium-uranium alloy and Example VII shows a method for recovering iridium from an iridium-uranium alloy.

*Example VI*

A one-kilogram charge of rhodium-uranium alloy was dissolved and separated as described in Example I.

The solid rhodium along with its impurities (100 grams total) was next contacted with 500 ml. concentrated sulfuric acid and digested for a period of seven hours, and to this solution 500 ml. H$_2$O and 0.02 wt. percent gelatin were added. The resulting solution was filtered and the solid residue water washed twice, using 250 ml. H$_2$O. The sulfate filtrate, initially and from both water washes, was held for additional processing.

The sulfuric acid-treated solid rhodium along with its impurities (100 grams total) was mixed with 600 grams pyrosulfate salt (K$_2$S$_2$O$_7$) and heated to a temperature of 900° C. for eight hours. This converted essentially 100% of the rhodium metal into rhodium sulfate in the solid state. The fusion solids were then slurried with 500 ml. H$_2$O and 60 ml. of 98% H$_2$SO$_4$ and filtered. The solid (containing 2 grams rhodium) was discarded and the sulfate filtrate added to the previously held sulfate filtrate.

Finally, zinc ions (in the form of ZnSO₄) were added to the combined sulfate solutions (1100 ml.) until the solution had a pH of 7.0, thereby reducing the rhodium to rhodium metal, and then the solution was filtered, the rhodium remaining as a solid residue essentially free of all impurities.

Better than 96% of the rhodium present in the initial one-kilogram charge of rhodium-uranium alloy was recovered.

*Example VII*

The same procedure and technique employed in Examples I and VI were used to recover iridium from an iridium-uranium alloy. Only about 35–40% iridium present in the initial one-kilogram charge of iridium-uranium alloy was recovered. It should be noted that the low per cent recovery of iridium might be attributed to the low solubility of $Ir(SO_4)_3$ and in this respect the iridium recovery probably could be enhanced by carrying out a chloride salt fusion in a chlorine atmosphere.

It is to be understood that the foregoing examples are merely illustrative and are not intended to limit the scope of this invention, but the invention should be limited only by the scope of the appended claims.

What is claimed is:

1. A process for the recovery of platinum metals from materials containing same therein which comprises the steps of contacting said material with a strong oxidizing agent to dissolve a portion of said platinum metal and render the remaining platinum metal substantially stable when subsequently heated, and thereafter performing an alkaline fusion on said stabilized platinum metal thereby oxidizing said platinum metal to the water soluble sulfate, and separately recovering said platinum metal.

2. A process for the recovery of platinum metals from materials containing same therein which comprises the steps of contacting said material with sulfuric acid thereby converting a portion of said platinum metal to the water soluble sulfate and rendering the remaining platinum metal substantially stable when subsequently heated, and thereafter performing an alkaline fusion on said stabilized platinum metal thereby oxidizing said platinum metal to the water soluble sulfate, and separately recovering said platinum metal.

3. The method of claim 1 wherein said platinum metal is rhodium.

4. The method of claim 1 wherein said platinum metal is iridium.

5. The method of claim 1 wherein said fusion step is carried out at a temperature above 750° C.

6. A process for the recovery of platinum metals from materials containing same therein which comprises the steps of contacting said material with a strong oxidizing agent to dissolve a portion of said platinum metal and render the remaining platinum metal substantially stable when subsequently heated, performing an alkaline fusion on said stabilized platinum metal thereby oxidizing said platinum metal to the water soluble sulfate, contacting said platinum metal sulfate with metallic ions to precipitate said platinum metal and recovering said precipitated platinum metal.

7. The method of claim 6 wherein said platinum metal is rhodium.

8. The method of claim 6 wherein said platinum metal is iridium.

9. The method of claim 6 wherein said oxidizing agent is concentrated sulfuric acid.

10. The method of claim 6 wherein said fusion step is carried out at a temperature above 750° C.

11. A process for recovering platinum metals from materials containing same therein which comprises the steps of contacting said material with sulfuric acid thereby converting a portion of said platinum metal to the water soluble sulfate and rendering the remaining platinum metal substantially stable when subsequently heated, performing a pyrosulfate fusion on said stabilized platinum metal thereby oxidizing said platinum metal to the water soluble sulfate, contacting said platinum metal sulfate with zinc ions to precipitate said platinum metal and thereafter recovering said precipitated platinum metal.

12. The method of claim 11 wherein said material is rhodium-uranium alloy.

13. The method of claim 11 wherein said material is iridium-uranium alloy.

14. The method of claim 11 wherein said pyrosulfate fusion is carried out at a temperature of about 900° C.

15. A process for recovering rhodium from rhodium-uranium alloy wherein said rhodium is dispersed in a finely-divided state comprising the steps of contacting said rhodium-uranium alloy with sulfuric acid thereby converting a portion of said rhodium to the water soluble rhodium sulfate and rendering the remaining rhodium substantially stable when subsequently heated, performing a pyrosulfate fusion on said stabilized rhodium thereby oxidizing said rhodium to rhodium sulfate, contacting said rhodium sulfate with zinc ions to precipitate said rhodium and thereafter recovering said precipitated rhodium metal.

16. In a process for the recovery of platinum metals from materials containing same wherein said platinum metal is subjected to an alkaline fusion to convert said platinum metal to the water soluble sulfate, the improvement of contacitng said material with sulfuric acid prior to said fusion step to thereby render said platinum metal substantially stable when subsequently heated.

References Cited

UNITED STATES PATENTS

| 1,876,943 | 9/1932 | Hall | 75—83 |
| 2,786,752 | 3/1957 | Appell | 75—83 |
| 3,166,404 | 1/1965 | Hausman | 75—83 |
| 3,238,038 | 3/1966 | Hunter | 75—121 |

FOREIGN PATENTS

| 289,220 | 4/1928 | Great Britain. |
| 316,063 | 8/1929 | Great Britain. |
| 495,262 | 11/1938 | Great Britain. |

DAVID L. RECK, *Primary Examiner.*

HYLAND BIZOT, *Examiner.*

N. F. MARKVA, *Assistant Examiner.*